United States Patent
Hanada et al.

(10) Patent No.: US 7,545,601 B2
(45) Date of Patent: Jun. 9, 2009

(54) MAGNETIC DISK DRIVE WITH LINE CONTACT

(75) Inventors: Kazuyoshi Hanada, Kanagawa (JP); Masaru Muranishi, Kanagawa (JP); Kenji Tomida, Kanagawa (JP); Yuji Ishima, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 501 days.

(21) Appl. No.: 11/304,258

(22) Filed: Dec. 14, 2005

(65) Prior Publication Data
US 2006/0126219 A1  Jun. 15, 2006

(30) Foreign Application Priority Data
Dec. 15, 2004 (JP) .............................. 2004-362840

(51) Int. Cl.
*G11B 17/02* (2006.01)
(52) U.S. Cl. .................................................. 360/98.08
(58) Field of Classification Search ............... 360/98.08, 360/99.05, 99.12
See application file for complete search history.

(56) References Cited
U.S. PATENT DOCUMENTS

| | | | | |
|---|---|---|---|---|
| 6,172,844 B1 * | 1/2001 | Luo et al. | ................ | 360/98.08 |
| 6,212,031 B1 * | 4/2001 | Kazmierczak et al. | ... | 360/98.08 |
| 6,414,817 B1 * | 7/2002 | Luo et al. | ................ | 360/98.08 |
| 6,462,902 B1 * | 10/2002 | Luo et al. | ................ | 360/99.12 |
| 6,788,495 B2 * | 9/2004 | Aiello | ...................... | 360/99.12 |
| 7,133,251 B2 * | 11/2006 | Kim et al. | ................ | 360/99.12 |
| 2002/0034041 A1 * | 3/2002 | Luo et al. | ................ | 360/99.12 |
| 2003/0169533 A1 * | 9/2003 | Aiello | ...................... | 360/98.08 |

FOREIGN PATENT DOCUMENTS

JP  2002-298479  10/2002

* cited by examiner

*Primary Examiner*—Tianjie Chen
(74) *Attorney, Agent, or Firm*—Townsend and Townsend and Crew LLP; John Henkhaus

(57) ABSTRACT

Embodiments of the invention provide a magnetic disk drive promoting even higher densities, greater capacities, and further reduction in size, while relaxing component accuracy requirements. In one embodiment, the magnetic disk drive includes a magnetic disk receiving member and a magnetic disk holding member, a magnetic disk being rotatably held with the magnetic disk clamped therebetween. The receiving member makes a line contact with a surface of the magnetic disk on a circumference of a circle formed around a rotational axis of the magnetic disk.

18 Claims, 4 Drawing Sheets

MAGNETIC DISK DRIVE WITH LINE CONTACT

CROSS-REFERENCES TO RELATED APPLICATIONS

This application claims priority from Japanese Patent Application No. JP2004-362840, filed Dec. 15, 2004, the entire disclosure of which is incorporated herein by reference.

BACKGROUND OF THE INVENTION

The present invention relates to a magnetic disk drive.

A magnetic disk drive, such as a hard disk drive (HDD), rotatably supports a magnetic disk.

FIG. 2 is a top view showing a typical HDD. FIG. 3 is a cross sectional view taken along line X-X of the HDD shown in FIG. 2. As shown in FIGS. 2 and 3, a magnetic disk 10 is rotatably supported in this HDD by being clamped by and between a motor hub 30 and a clamp member 40.

FIG. 4 is a cross sectional view showing an example of a conventional motor hub used in this HDD. Referring to FIG. 4, the conventional motor hub 30 has been formed so as to include a disk receiving surface 32 that makes a surface contact with a surface of the magnetic disk 10 and provides a support therefor.

The disk receiving surface 32 has been formed as detailed in the following in consideration of flexure of the motor hub 30 occurring as a result of weight of the magnetic disk 10 when the magnetic disk 10 is secured. Specifically, the surface 32 is an inclined surface having a head m forming an inclined angle α that corresponds to an angle of the flexure over a distance between an inner peripheral position and an outer peripheral position. The inner peripheral position is an inner radius a away from a rotational axis A of the magnetic disk 10. The outer peripheral position is an outer radius b away from the rotational axis A of the magnetic disk 10. A known system is disclosed in Japanese Patent Laid-open No. 2002-298479.

BRIEF SUMMARY OF THE INVENTION

In the aforementioned conventional magnetic disk drive, however, it has been difficult to enhance productivity because of the necessity involved with machining to close tolerances the inclined angle α of the disk receiving surface 32 of the motor hub 30.

Further, the disk receiving surface 32 and the surface of the magnetic disk 10 are brought into the surface contact with each other in the conventional magnetic disk drive. Consequently, deformation has occurred in the magnetic disk 10 after fixing because, for example, of microscopic protrusions and indentations on the surface thereof.

The deformation of the magnetic disk 10 involved with the surface roughness forms one factor impeding recording and reading of information and the like. This is particularly true when it is required that several nanometers be maintained as a flying distance of the magnetic head 20 with the recent trend toward higher densities, greater capacities, and further reduction in size of the magnetic disk drive. There is, however, a technical limit to accuracy in this surface machining.

It is therefore a feature of the present invention to provide a magnetic disk drive promoting even higher densities, greater capacities, and further reduction in size, while relaxing component accuracy requirements.

To solve the problem of the prior art, a magnetic disk drive according to a first aspect of the present invention includes a magnetic disk receiving member and a magnetic disk holding member, a magnetic disk being rotatably held with the magnetic disk clamped therebetween. The magnetic disk drive is characterized in that the receiving member makes a line contact with a surface of the magnetic disk on a circumference of a circle formed around a rotational axis of the magnetic disk.

A magnetic disk drive according to a second aspect of the present invention includes a magnetic disk receiving member and a magnetic disk holding member, a magnetic disk being rotatably held with the magnetic disk clamped therebetween. The magnetic disk drive is characterized in that the receiving member includes a ridge on a circumference of a circle formed around a rotational axis of the magnetic disk, and that the receiving member makes contact with a surface of the magnetic disk on an apex of the ridge.

It is appropriate that the holding member press the magnetic disk against the receiving member at a position opposing a position of contact of the receiving member with the magnetic disk.

It is also appropriate that the receiving member be formed integrally with a motor hub.

According to the present invention, a magnetic disk drive promoting even higher densities, greater capacities, and further reduction in size, while relaxing component accuracy requirements, can be provided.

DETAILED DESCRIPTION OF THE INVENTION

A magnetic disk drive according to a specific embodiment of the present invention will be described with reference to the accompanying drawings. The embodiment of the present invention will be described by using as an example a case, in which the magnetic disk drive according to the embodiment of the present invention (hereinafter referred to as the "disk drive") is constructed as an HDD as shown in FIGS. 2 and 3.

Figure 2:
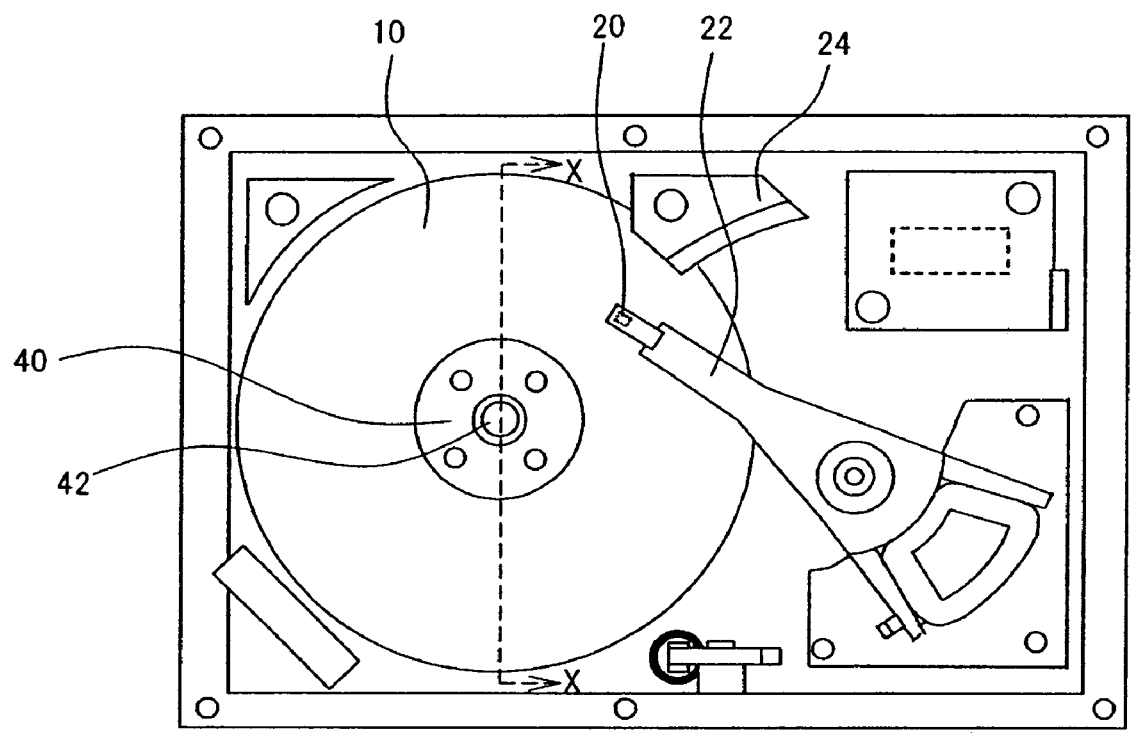
FIG. 2 is a top view showing a typical hard disk drive.
Figure 3:
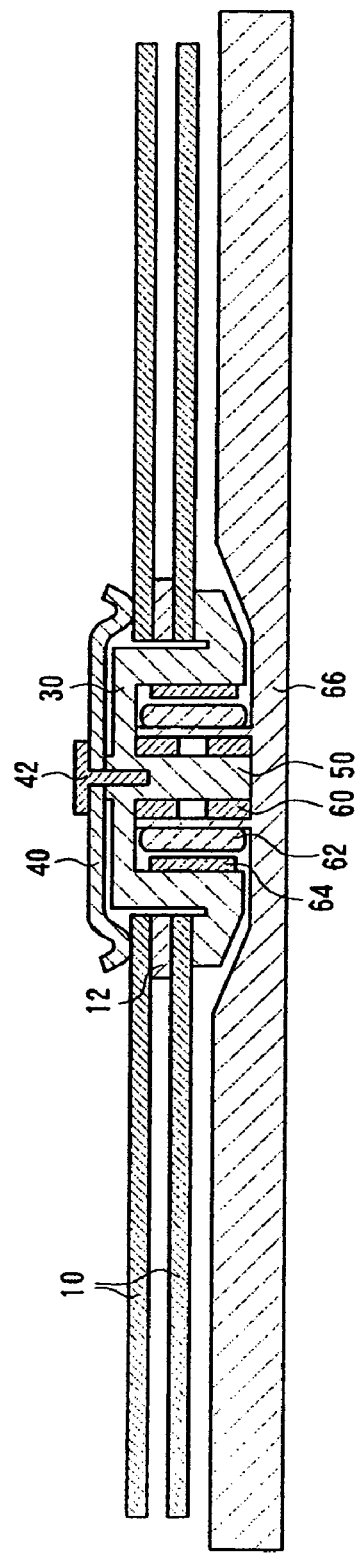
FIG. 3 is a cross sectional view taken along line X-X of the hard disk drive shown in FIG. 2.

Specifically, referring to FIGS. 2 and 3, the disk drive rotatably holds two magnetic disks 10, on each of which information is recorded and which are clamped by and between a motor hub 30 and a clamp member 40.

The two magnetic disks 10 are held by being stacked one on top of the other via an annular disk spacer 12.

Hereunder, of the two magnetic disks 10, the magnetic disk located upward of the disk spacer 12 will be referred to as an upper disk 10a and the magnetic disk located downward of the disk spacer 12 will be referred to as a lower disk 10b. In cases where it is not particularly necessary to differentiate between the two, each is simply referred to as the magnetic disk 10.

The motor hub 30 includes a shaft portion 50 functioning as a rotational axis of a spindle motor. The motor hub 30 is rotatably held on a base 66 via a bearing 60, a stator 62, a magnet 64, and the like.

The disk drive also includes a magnetic head 20. The magnetic head 20 flies above a surface of the magnetic disk 10 with a flying distance of only several nanometers away therefrom. The magnetic head 20 thereby writes information to, reads information from, the magnetic disk 10 and performs related tasks. The magnetic head 20 is secured to a head arm 22 through bonding or soldering. The head arm 22 holds the magnetic head 20 by allowing the magnetic head 20 to fly over the magnetic disk 10.

When writing information or performing a related task, the magnetic head 20 flies over the surface of the magnetic disk 10 with the aforementioned flying distance. When not writing information or performing a related task, on the other hand, the magnetic head 20 is retracted from the surface of the magnetic disk 10 to a latch portion 24 through rotation of the head arm 22.

The disk drive includes four magnetic heads 20 (not shown). Each of the four magnetic heads 20 writes information to a corresponding one of four different surfaces of the magnetic disks 10, and performs related tasks relative thereto. The four different surfaces of the magnetic disks 10 are: an upper surface and a lower surface of the upper disk 10a and an upper surface and a lower surface of the lower disk 10b.

The magnetic disk 10 is a disk substrate made mainly of glass or aluminum coated with a magnetic layer. The main material for the motor hub 30, the clamp member 40, and the disk spacer 12 is stainless steel, aluminum, or iron.

Figure 1:
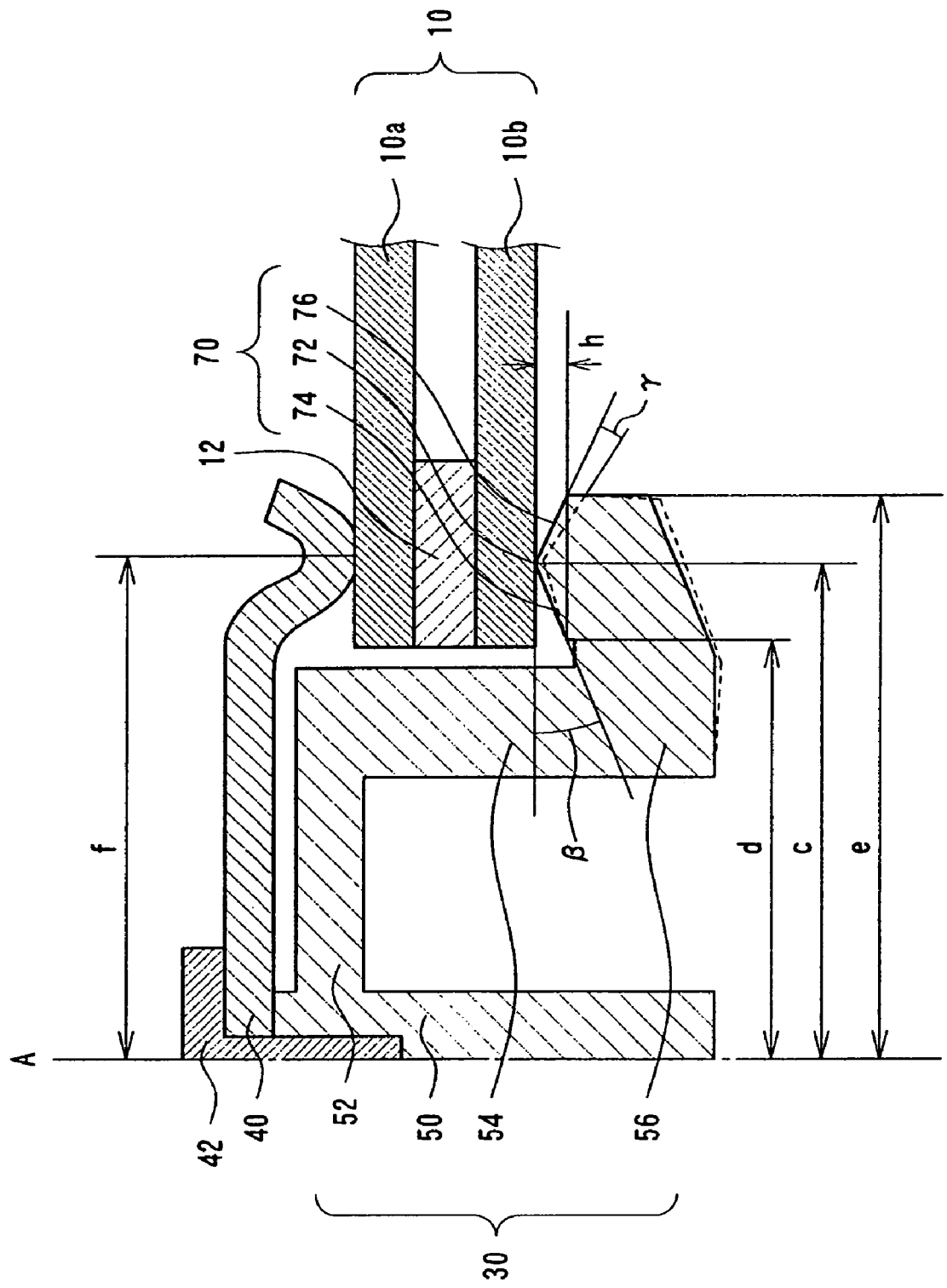
FIG. 1 is a cross sectional view showing a disk receiving portion of a motor hub according to an embodiment of the present invention.

FIG. 1 is a cross sectional view showing a portion of the disk drive, in which the magnetic disk 10 and the motor hub 30 are in contact with each other. Referring to FIG. 1, the motor hub 30 includes a top board portion 52, a side board portion 54, and a disk receiving portion 56. The top board portion 52 is formed on an upper end of the shaft portion 50 into a disk having a rotational axis A of the shaft portion 50 as a center thereof. The side board portion 54 is formed downwardly from an outer peripheral end of the top board portion 52. The side board portion 54 serves as a cylindrical side wall having the top board portion 52 as a bottom surface thereof. The disk receiving portion 56 is extended in an outer peripheral direction from a lower end of the side board portion 54.

The magnetic disk 10 is secured to the motor hub 30 as follows. Specifically, the lower disk 10b, the disk spacer 12, and the upper disk 10a are stacked in that order on the disk receiving portion 56. The clamp member 40 is placed over the upper disk 10a so as to cover the top board portion 52. The clamp member 40 is then secured to the top board portion 52 by tightening a clamp screw 42.

Referring to FIG. 1, the disk receiving portion 56 of the motor hub 30 supports the lower disk 10b and the upper disk 10a as follows. Specifically, the disk receiving portion 56 makes a line contact with the lower surface of the lower disk 10b on a circumference of a circle having a contact radius c about the center of the rotational axis A of the magnetic disk 10. This line contact is made with the magnetic disk 10 secured to the disk receiving portion 56.

Specifically, the disk receiving portion 56 includes a ridge portion 70. The ridge portion 70 is formed such that the surface of the disk receiving portion 56 on the side of the lower disk 10b is shaped substantially into an inverted V in a cross section thereof. The ridge portion 70 is in contact with the lower surface of the lower disk 10b at an apex 72 thereof located on a contact circumference of a circle having the contact radius c.

The ridge portion 70 includes an inner inclined surface 74 and an outer inclined surface 76. The inner inclined surface 74 is formed over an area covering from the apex 72 of the ridge portion 70 to a circumference of a circle having an inner peripheral radius d on an inner peripheral side of the motor hub 30. The outer inclined surface 76 is formed over an area covering from the apex 72 to a circumference of a circle having an outer peripheral radius e on an outer peripheral side of the motor hub 30.

The apex 72, the inner inclined surface 74, and the outer inclined surface 76 of the ridge portion 70 are formed such that the apex 72 supports the lower surface of the lower disk 10b through a line contact therewith even if flexure occurs in the motor hub 30 due to mounting of the magnetic disk 10 or the like.

More specifically, assume, for example, a case, in which the motor hub 30 flexes downwardly over an angle γ as shown by a dotted line in FIG. 1 due to mounting of the magnetic disk 10 or the like. The inner inclined surface 74 of the ridge portion 70 is formed such that an angle β formed by a plane perpendicular to the rotational axis A of the magnetic disk 10 in a condition before the flexure occurs is substantially larger than the angle γ.

Specifically, the inner inclined surface 74 of the ridge portion 70 is formed to be an inclined surface having the inclined angle β. For example, the inner inclined surface 74 is formed to have a sufficient head h over an area from the apex of the contact radius c of the disk receiving portion 56 to the inner periphery of the inner peripheral radius d.

The clamp member 40 presses the disk receiving portion 56 against the upper disk 10a at a position opposing a position of contact between the ridge portion 70 of the disk receiving portion 56 and the lower surface of the lower disk 10b.

More specifically, the clamp member 40 contacts the upper surface of the upper disk 10a on a circumference of a circle having a pressure radius f that is substantially equal to the contact radius c of the circumference, on which the apex 72 of the ridge portion 70 of the disk receiving portion 56 contacts the lower surface of the lower disk 10b.

Figure 4:
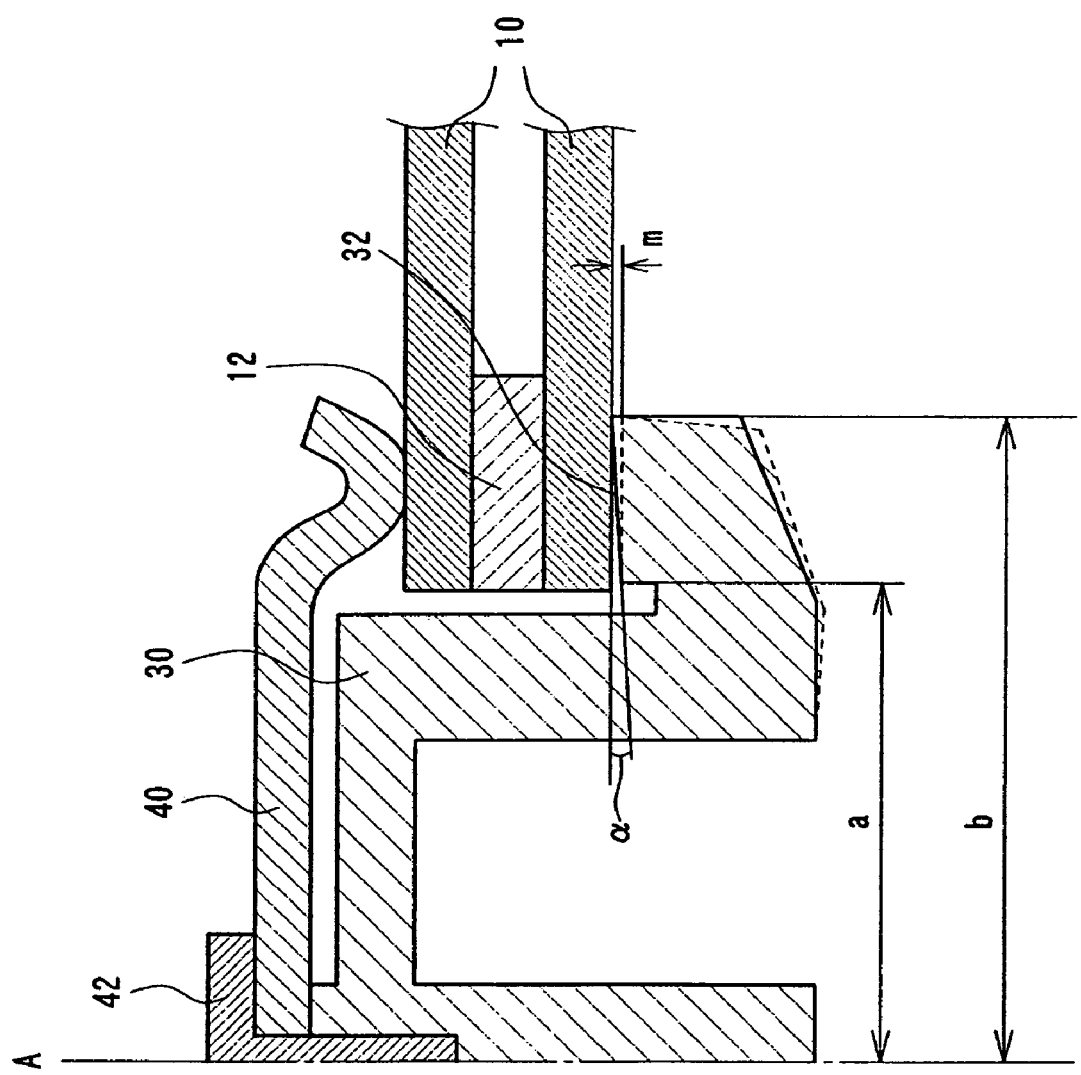
FIG. 4 is a cross sectional view showing an example of a disk receiving surface of a conventional motor hub.

According to this disk drive, it is only necessary to form the motor hub 30 so as to support the magnetic disk 10 through the line contact regardless of the angle of flexure of the motor hub 30. Accordingly, as compared with the conventional motor hub 30 shown in FIG. 4, machining accuracy requirements can be relaxed, productivity can be enhanced, and manufacturing cost can be reduced.

According to this disk drive, the motor hub 30 supports the magnetic disk 10 through the line contact. Accordingly, for example, deformation of the magnetic disk 10 attributable to surface roughness of the magnetic disk 10 can be suppressed. It is also possible, for example, to stably maintain a distance of several nanometers as the flying distance of the magnetic head 20.

According to this disk drive, the motor hub 30 is formed such that stiffness of the side board portion 54 and the disk receiving portion 56 is higher than that of the top board portion 52. For example, the side board portion 54 and the disk receiving portion 56 are formed to have a greater thickness in cross section than that of the top board portion 52 as shown in FIG. 1.

Through these arrangements, flexure of the motor hub 30 occurring in conjunction with mounting of the magnetic disk 10 or the like develops as deformation of the top board portion 52. Accordingly, it is relatively easy to control the angle of flexure of the motor hub 30 using the stiffness of the top board portion 52.

In addition, in this disk drive, of the motor hub 30, the disk spacer 12, and the clamp member 40 that are all in contact with the magnetic disk 10, stiffness of a specific part that can be machined and formed to relatively closer tolerances is made higher as compared with that of the others. If, for example, a stringent range of tolerances can be achieved in terms of flatness of a surface of the disk spacer 12 in contact with the magnetic disk 10, the disk spacer 12 is formed of a material having a higher stiffness than the motor hub 30 or the clamp member 40.

Accordingly, the magnetic disk 10 is secured being in contact with the disk spacer 12 that is formed to offer a smooth surface and hard to be deformed. The magnetic disk 10 can therefore be effectively prevented from being deformed.

The magnetic disk according to the present invention is not limited to the foregoing embodiment. For example, the ridge portion 70 of the disk receiving portion 56 is not limited to a structure formed integrally with the motor hub 30. It is appropriate that the ridge portion 70 of the disk receiving portion 56 be formed separately from the motor hub 30 and disposed thereon.

The ridge portion 70 is not limited to a structure formed throughout an entire circumference of a circle of the contact radius c. For example, it is appropriate that a plurality of ridge portions be formed at predetermined intervals on the circumference.

Further, the ridge portion 70 is not limited to one formed substantially into an inverted V in its cross section, as long as the ridge portion 70 makes a line contact with the magnetic disk 10 on the circumference of a circle of the contact radius. For example, it is appropriate that the ridge portion 70 be formed substantially into an inverted U with a curved surface on the apex thereof.

Further, the clamp member 40 is not limited to one making a line contact with the upper surface of the upper disk 10a. It is appropriate that the clamp member 40 be one making a surface contact with the upper surface of the upper disk 10a. In addition, it is appropriate that the number of magnetic disks 10 clamped between the disk receiving portion 56 and the clamp member 40 be three or more, or one.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive including a magnetic disk receiving member and a magnetic disk holding member, a magnetic disk being rotatably held with the magnetic disk clamped therebetween,
wherein the magnetic disk receiving member makes a line contact with a surface of the magnetic disk on a circumference of a circle having a contact radius formed around a rotational axis of the magnetic disk, and
wherein the magnetic disk receiving member has an upper surface including in a middle portion in a radial direction, an apex of a V-shaped ridge to make the line contact with the surface of the magnetic disk.

2. The magnetic disk drive according to claim 1,
wherein the magnetic disk holding member presses on an opposite surface of the magnetic disk against the magnetic disk receiving member at a position opposing a position of contact of the receiving member with the magnetic disk.

3. The magnetic disk drive according to claim 2,
wherein the magnetic disk holding member makes a line contact with the opposite surface of the magnetic disk on a circumference of a circle having a pressure radius formed around the rotational axis of the magnetic disk.

4. The magnetic disk drive according to claim 3,
wherein the pressure radius of the circle of line contact between the magnetic disk holding member and the opposite surface of the magnetic disk is substantially equal to the contact radius of the circle of line contact between the magnetic disk receiving member and the surface of the magnetic disk.

5. The magnetic disk drive according to claim 2,
wherein the magnetic disk holding member makes a surface contact with the opposite surface of the magnetic disk.

6. The magnetic disk drive according to claim 1,
wherein the magnetic disk receiving member is formed integrally with a motor hub.

7. The magnetic disk drive according to claim 6,
wherein the motor hub includes a shaft portion in a center position, a top board portion extending outwardly from the shaft portion, a side board portion extending from the top board portion and being parallel to the shaft portion, and a disk receiving portion which forms the magnetic disk receiving member, the side board portion and the disk receiving portion being higher in stiffness than the top board portion.

8. The magnetic disk drive according to claim 1,
wherein the magnetic disk holding member presses on an opposite surface of another magnetic disk, which is stacked over the magnetic disk in line contact with the magnetic disk receiving member, against the magnetic disk receiving member.

9. The magnetic disk drive according to claim 8,
wherein the magnetic disks are separated by a disk spacer disposed therebetween.

10. A magnetic disk drive including a magnetic disk receiving member and a magnetic disk holding member, a magnetic disk being rotatably held with the magnetic disk clamped therebetween,
wherein an upper surface of the receiving member includes in a middle portion and in a radial direction a ridge on a circumference of a circle formed around a rotational axis of the magnetic disk;
wherein the receiving member makes contact with a surface of the magnetic disk on an apex of the ridge, and
wherein the ridge of the magnetic disk receiving member is a V-shaped ridge with the apex to make line contact with the surface of the magnetic disk.

11. The magnetic disk drive according to claim 10,
wherein the magnetic disk holding member presses on an opposite surface of the magnetic disk against the magnetic disk receiving member at a position opposing a position of contact of the receiving member with the magnetic disk.

12. The magnetic disk drive according to claim 11,
wherein the magnetic disk holding member makes a line contact with the opposite surface of the magnetic disk on a circumference of a circle having a pressure radius formed around the rotational axis of the magnetic disk.

13. The magnetic disk drive according to claim 12,
wherein the pressure radius of the circle of line contact between the magnetic disk holding member and the opposite surface of the magnetic disk is substantially equal to the contact radius of the circle of line contact between the magnetic disk receiving member and the surface of the magnetic disk.

14. The magnetic disk drive according to claim 11,
wherein the magnetic disk holding member makes a surface contact with the opposite surface of the magnetic disk.

15. The magnetic disk drive according to claim 10,
wherein the magnetic disk receiving member is formed integrally with a motor hub.

16. The magnetic disk drive according to claim 15,
wherein the motor hub includes a shaft portion in a center position, a top board portion extending outwardly from the shaft portion, a side board portion extending from the top board portion and being parallel to the shaft portion, and a disk receiving portion which forms the magnetic disk receiving member, the side board portion and the disk receiving portion being higher in stiffness than the top board portion.

17. The magnetic disk drive according to claim 10,
wherein the magnetic disk holding member presses on an opposite surface of another magnetic disk, which is stacked over the magnetic disk in line contact with the magnetic disk receiving member, against the magnetic disk receiving member.

18. The magnetic disk drive according to claim 17,
wherein the magnetic disks are separated by a disk spacer disposed therebetween.

* * * * *